(12) United States Patent
Morgan (10) Patent No.: US 8,943,556 B2
(45) Date of Patent: Jan. 27, 2015

(54) SECURE INFORMATION RELEASE (71) Applicant: Intel Corporation, Santa Clara, CA (US)

(72) Inventor: Dennis M. Morgan, Pine Grove, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 13/629,658

(22) Filed: Sep. 28, 2012

(65) Prior Publication Data
US 2014/0096195 A1    Apr. 3, 2014

(51) Int. Cl.
G06F 7/04       (2006.01)
G06F 15/16      (2006.01)
G06F 17/30      (2006.01)
H04L 29/00      (2006.01)

(52) U.S. Cl.
USPC .................................................. 726/4

(58) Field of Classification Search
CPC ...................................................... H04L 29/06
USPC ........................................................... 726/4
See application file for complete search history.

(56) References Cited

U.S. PATENT DOCUMENTS

| 7,461,260 | B2 | 12/2008 | Drews |
| 8,359,629 | B2 | 1/2013 | Kohlenberg |
| 8,616,453 | B2 * | 12/2013 | Itwaru ...................... 235/462.01 |
| 2008/0229100 | A1 | 9/2008 | Trodden |
| 2010/0023782 | A1 | 1/2010 | Prakash |
| 2010/0115609 | A1 * | 5/2010 | Spence ........................... 726/19 |
| 2010/0180328 | A1 * | 7/2010 | Moas et al. ...................... 726/6 |
| 2011/0035604 | A1 * | 2/2011 | Habraken ..................... 713/193 |
| 2012/0220227 | A1 * | 8/2012 | Dobyns ......................... 455/41.1 |
| 2013/0074158 | A1 * | 3/2013 | Koskimies et al. ............... 726/4 |

OTHER PUBLICATIONS

"Access Accounts More Securely with Intel Identity Protection Technology," retrieved from Internet on Mar. 28, 2013; http://ipt.intel.com/Libraries/Documents/Intel_IdentityProtect_techbrief_v5.sflb.ashx, (2 pages).

* cited by examiner

*Primary Examiner* — Dant Shaifer Harriman
(74) *Attorney, Agent, or Firm* — Trop, Pruner & Hu, P.C.

(57) ABSTRACT

An embodiment of the invention provides a responder such as a health care professional with quick and secure access to select information about a user. An embodiment of such quick and secure access to select information may include receiving a user request to authenticate a responder mobile phone from the responder mobile phone, separately sending a common secure data to each of the responder's mobile phone and the user's mobile phone, receiving user authorization to release select data to the responder's mobile phone, the user's authorization received from the responder's mobile phone. Other embodiments are described herein.

16 Claims, 4 Drawing Sheets

SECURE INFORMATION RELEASE

BACKGROUND

Injuries and sudden sickness (e.g., heart attack, stroke) can occur when least expected. As such, the person who is sick or injured may not have relevant medical information at their disposal. This may affect a responder's (e.g., paramedic, emergency room nurse or doctor) ability to properly assess the accident/illness or to provide proper treatment. Even if the responder has authorization to access the person's medical information, if there is a delay in receiving the information, the responder may not be aware of critical information when doing an initial assessment. Furthermore, when the responder does receive the sick/injured person's information, it may be out of date, incomplete, or both. Consequently, the responder may not know about an existing condition or a contraindicated medicine. Without such information, the sick or injured person may not be properly diagnosed and/or receive correct treatment. Furthermore, the person's information may be openly available during transit to the responder. Thus, a person who has suffered an accident or illness (and his or her medical information) may not be receiving proper care.

BRIEF DESCRIPTION OF THE DRAWINGS

Features and advantages of embodiments of the present invention will become apparent from the appended claims, the following detailed description of one or more example embodiments, and the corresponding figures, in which:

DETAILED DESCRIPTION

In the following description, numerous details are set forth, but embodiments of the invention may be practiced without these specific details. To promote understanding of embodiments of the invention, this description does not show details of well-known circuits, structures, and techniques. "An embodiment," "various embodiments," and the like indicate that the described embodiment(s) may include particular features, structures, or characteristics, but not every embodiment necessarily includes the particular features, structures, or characteristics. Some embodiments may have some, all, or none of the features described for other embodiments. "First," "second," "third," and the like may describe a common object and refer to different instances of the common object and not to a sequence of any kind. "Connected" may indicate elements are in direct physical or electrical contact with each other, and "coupled" may indicate elements cooperate or interact with each other, but they may or may not be in direct physical or electrical contact. Also, similar or same numbers may be used to designate similar or same parts in different figures, but this does not mean all figures including similar or same numbers constitute a single or same embodiment.

In the event of an accident (e.g., broken bone) or sudden illness (e.g., stroke, heart attack) the emergency telephone number (911) may be called. Alternatively, the sick or injured person may go to an in-store clinic, an urgent care center, a hospital emergency room (ER), or similar facility. An embodiment of the invention provides a responder with quick and secure access to select information about the sick/injured person. And the sick/injured person may feel secure in knowing that the responder may access the select information in a timely and secure manner. An embodiment of such a system 100 is shown in FIG. 1, which may include a responder device 102, a user device 104, a network 106, a cloud service 108, a storage location 110, and a transfer location 112.

Figure 1:
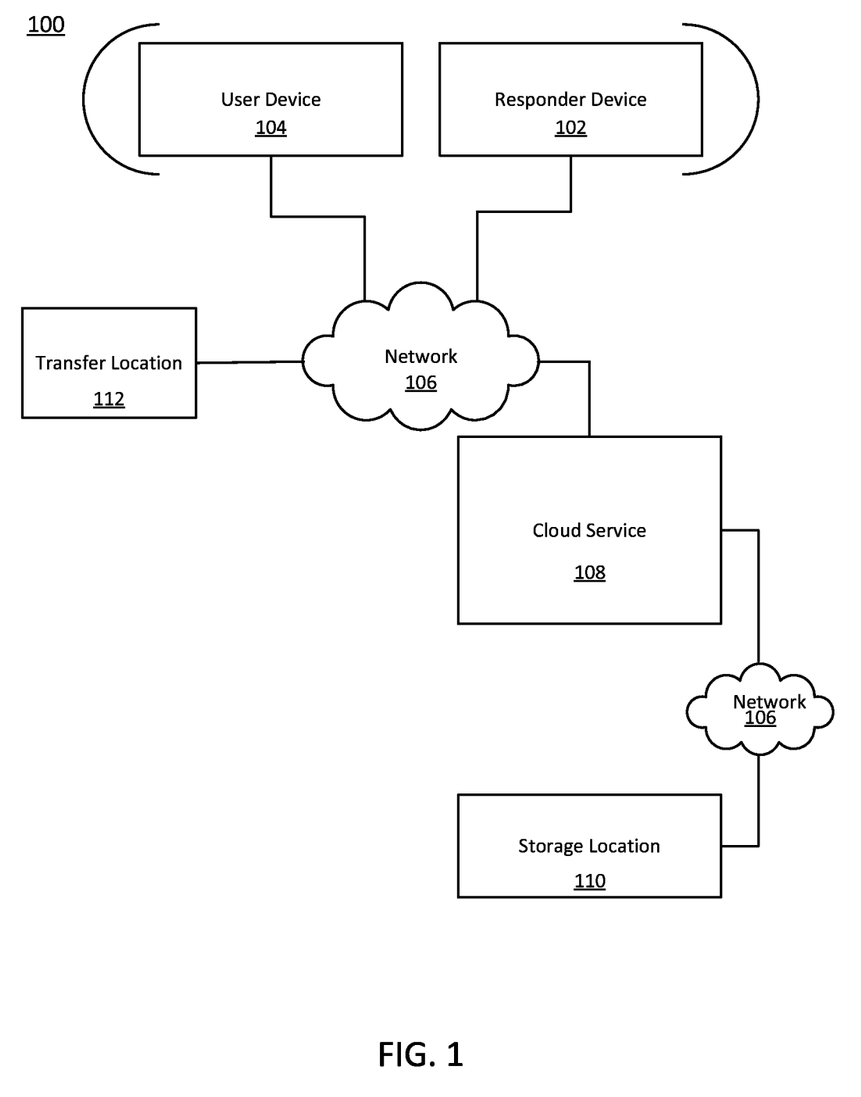
FIG. 1 includes a schematic block diagram of an embodiment of the invention.

Referring to FIG. 1, which shows an embodiment of the system 100, an initial responder may be associated with the responder device 102 and the person seeking medical assistance may be associated with the user device 104. The responder may be a person (e.g., paramedic, nurse, doctor) or an entity (e.g., ambulance, clinic, hospital ER), and the person seeking medical assistance may be a mobile device 104 user who has registered with the cloud service 108.

In an embodiment, the responder device 102 and the user device 104 may communicate when in close proximity, which is indicated in FIG. 1 by the curved brackets. One example of close proximity communications is near field communication (NFC). Generally, NFC enabled devices (e.g., devices 102 and 104) can establish radio communications when they come in contact with each other or they are brought within a close range such as a few centimeters. NFC communications, however, may be established at other distances such as 0.25, 0.5, 0.75, 1.0, 1.25, 1.5, 1.75, and 2.0 meters. Because NFC is at such close proximity, communications between two enabled devices are usually considered secure. A wireless personal network (WPAN) such as Bluetooth is another example of close proximity communications. Bluetooth communications between the devices 102 and 104 may take place as is known in the art. The responder device 102 and the user device 104 may also communicate via the network 106. The network 106 may include one or more wired or wireless communication networks such as cellular networks, wired and wireless wide area networks, and the internet. Although the responder device 102 and the user device 104 may both be NFC enabled, Bluetooth enabled, and able to couple to the network 106, the responder device 102 and the user device 104 may or may not be the same type of device. For example, the responder device 102 and the user device 104 may each be a compute node such as a mobile compute node (e.g., mobile telephones, smart phones, tablet computers, laptop computers, and wearable special purpose devices), a desktop computer, and an on-board computer, but they do not have to be the same type of compute node.

An embodiment of the system 100 may also include the cloud service 108. The cloud service 108 may be in a data center or a hub, each of which may include one or more compute nodes such as servers, which, in turn, may include one or more virtual machines or access thereto. Furthermore, the cloud service 108 may provide or have access to one or more storage devices, which may store user profiles, responder profiles, and other data files and/or program files. In an embodiment, the cloud service 108 may include at least one storage and/or memory medium, which may be a temporary storage, to store one or more select user data items. The responder device 102 and the user device 104 may each access the cloud service 108 via the network 106 and vice versa.

In addition to profile information, the cloud service 108 may also have access to user medical records. User medical records may be stored in a compute node accessible storage medium/device housed at the storage location 110. In an embodiment, the storage location 110 may be a remote storage location such as offices and/or storage centers associated with one or more of primary health care providers, insurance companies, pharmacies, and other locations where current medical records may be kept. In an embodiment, the cloud service 108 may store user medical records, or portions thereof, in a compute node accessible storage medium/device housed at a local storage location 110. The local storage location 110 may house a plurality of compute node accessible storage media or devices including at least one temporary storage/memory medium to store select user data items. In an embodiment, user medical records or portions thereof may be stored on compute node accessible storage media/devices housed at both local and remote storage locations 110. A compute node accessible storage medium/device may be a type of storage device known in the art to store data such as a disk (e.g., hard disk, optical disk), a solid state drive, and the like.

An embodiment of system 100 may include a transfer location 112. The transfer location 112 may be any location to which the initial responder transfers the user for further treatment or observation. For example, if the initial responder is an ambulance/EMS personnel, the transfer location 112 may be a hospital emergency room. Alternatively, if the initial responder is a hospital emergency room, the transfer location 112 may be the same hospital, but the user is being admitted as a patient. The network 106 may connect a compute node at the transfer location 112 to one or more other components of the system 100.

To implement an embodiment of the invention, each responder and each user may obtain or create a unique responder identifier (ResponderID) and a unique user identifier (UserID) respectively. A ResponderID may be unique to an individual or to an entity. In an embodiment, individual responders and entity responders may each have a unique ResponderID. Each particular user, however, receives his or her own unique UserID. Unique identifiers (e.g., ResponderID, UserID) may be created or obtained in numerous ways such as by being generated by a random number generator, created by the user, hard coded into a corresponding responder device 102 or user device 104, provided for each instance of authentication, and combinations thereof.

In an embodiment, the cloud service 108 may use ResponderIDs to identify responders according to responder type. Responders may be classified in many ways and embodiments of the invention are not limited to a particular classification system. For example, responders may be classified by tiers, wherein Tier 1 responders include on-scene responders such as firefighters, peace officers, and paramedics; Tier 2 responders may include quick-care responders such as in-store clinics; Tier 3 responders may include full-service urgent care centers that are not located at or near a hospital; Tier 4 responders may include hospital emergency rooms; and Tier 5 responders may include primary care providers. The cloud service 108 may maintain records of responders and corresponding ResponderIDs. These records may also include a responder type (e.g., tier) and whether the responder is currently approved (e.g., in good standing, up-to-date with permits, licenses' and other credentials, and/or other information relevant to user treatment). In an embodiment, responders may provide information/create a responder profile when registering with the cloud service 108. In an embodiment, the cloud service 108 may gather responder information from available public sources.

Likewise, an embodiment of the invention may use UsedIDs to identify individual users. For example, each user may register with the service 108. During registration, a user may provide or receive a UserID, and create a user profile associated with the unique UserID. User profiles may include personal information elements such as user name, address, phone number, and the like. User profiles may also include user medical information elements such as known allergies, current medications, current conditions, recent surgeries, and other user information and/or medical history. Furthermore, user profiles may include user relationship information elements such as primary care provider(s), insurance provider, preferred hospital, emergency contact, next of kin, and other relationship information that a user may want to include in his or her profile. For user profiles to remain as accurate as possible, each user and/or or the cloud service 108 may periodically update his or her profile. In an embodiment, the cloud service 108 may update user profiles using push or pull technologies performed at a predetermined interval or on an as-needed basis or both. Push/pull intervals may be daily, weekly, monthly, and the like and they may be tailored to the health of a particular user. For example, healthy users may not need profile updates as frequently as unhealthy users.

In an embodiment, each user may enable release of select data items to different tiers of responders as he or she sees fit. For example, when creating his or her user profile, a user may mark or tag each information element with one or more responder tiers indicating that the data item associated with marked or tagged information element may be released to the marked one or more responder tiers. In this way, each user may configure a personalized data release scheme. For example, a first user may mark or tag the name, known allergies, and emergency contact information elements with each responder tier, and may mark or tag the insurance provider and next of kin information elements with Tier 3, 4, and 5 responders. In this way, the first user created a data release scheme that will enable the release of a set of data items including his or her name (e.g., John Doe), known allergies (e.g., penicillin) and emergency contact information (e.g., xxx-xxx-xxxx) to all responders, regardless of tier. According to the first user's data release scheme, however, a different set of data items has been enabled for release to a Tier 3, 4, or 5 responders. This different set of data items will include the data items released to the Tier 1 and Tier 2 responders and data items corresponding to his or her insurance provider (e.g., BigInsurance) and next of kin (e.g., Nancy). As another example, a second user may mark or tag each of the personal information elements, and the known allergies and current medications medical information elements with Tier 1 through Tier 5 responders, and may mark or tag all of the remaining information elements in his or her user profile with Tier 3, Tier 4, and Tier 5 responders. Thus, the second user has configured his or her data release scheme to enable release of a set of data items including his or her name (e.g., Jane Doe), address (e.g., 10 Tenth St.), phone number (e.g., xxx-xxx-xyyy), known allergies (e.g., peanuts), and current medications (e.g., antihistamines) to all responder tiers, and release of a different set of data items that includes the forgoing data items and all other medical and relationship data contained in his or her user profile to Tier 3, Tier 4, and Tier 5 responders. Some users, however, may not personalize a data release scheme, and as such, the cloud service 108 may release user data items according to a predetermined default data release scheme.

An embodiment may also allow users to configure a data access scheme. For example, tier appropriate data items selected for release (according to a data release scheme) eventually may be downloaded to the responder device 102, stored by the cloud service 108, or both. If downloaded to the responder device 102, tier appropriate user data items may be stored in a secure region of the responder device 102 memory. If stored in the cloud, the cloud service 108 may store tier appropriate user data items in a location that is accessible to the responder device 102 such as via the network 106. Whether downloaded to the responder device 102 or stored by the cloud service 108, or both, a released set of tier appropriate user data items may be temporarily accessed by the responder device 102 and/or temporarily stored (e.g., responder device memory, cloud temporary storage). Referring back to the example of the first user's data release scheme, the first user may indicate that the data items marked for release to all responder tiers also may be downloaded to the responder device 102. The first user, however, may indicate that any other data items selected for release should not be downloaded to the responder device 102. Thus, according to the first user's data release scheme and data access scheme, the cloud service 108 may download the first user's name, known allergies, and emergency contact information to a Tier 3, 4, or 5 responder's device 102 for storage in a secure memory location. But the cloud service 108 may not download the first user's insurance provider and/or next of kin information to the Tier 3, 4, or 5 responder device 102. Rather, the responder may use its device 102 to connect to the cloud service 108 (e.g., via the network 106) to access the needed information. In an embodiment, if a user does not create a data access scheme, the cloud service 108 may download/store released user data items according to a default data access scheme. Furthermore, in an embodiment, responders may not want certain user data downloaded their compute nodes. Thus, when a responder is creating or updating its information/profile, the responder may indicate what user data items it does not want to have downloaded to its device 102. In the case where a user permits a particular data item to be downloaded to a responder device 102 and the responder associated with the device does not want that particular data item to be downloaded, the subject user data item may be stored by the cloud service 108 together with any other user data items that were not designated for download.

Figure 2:
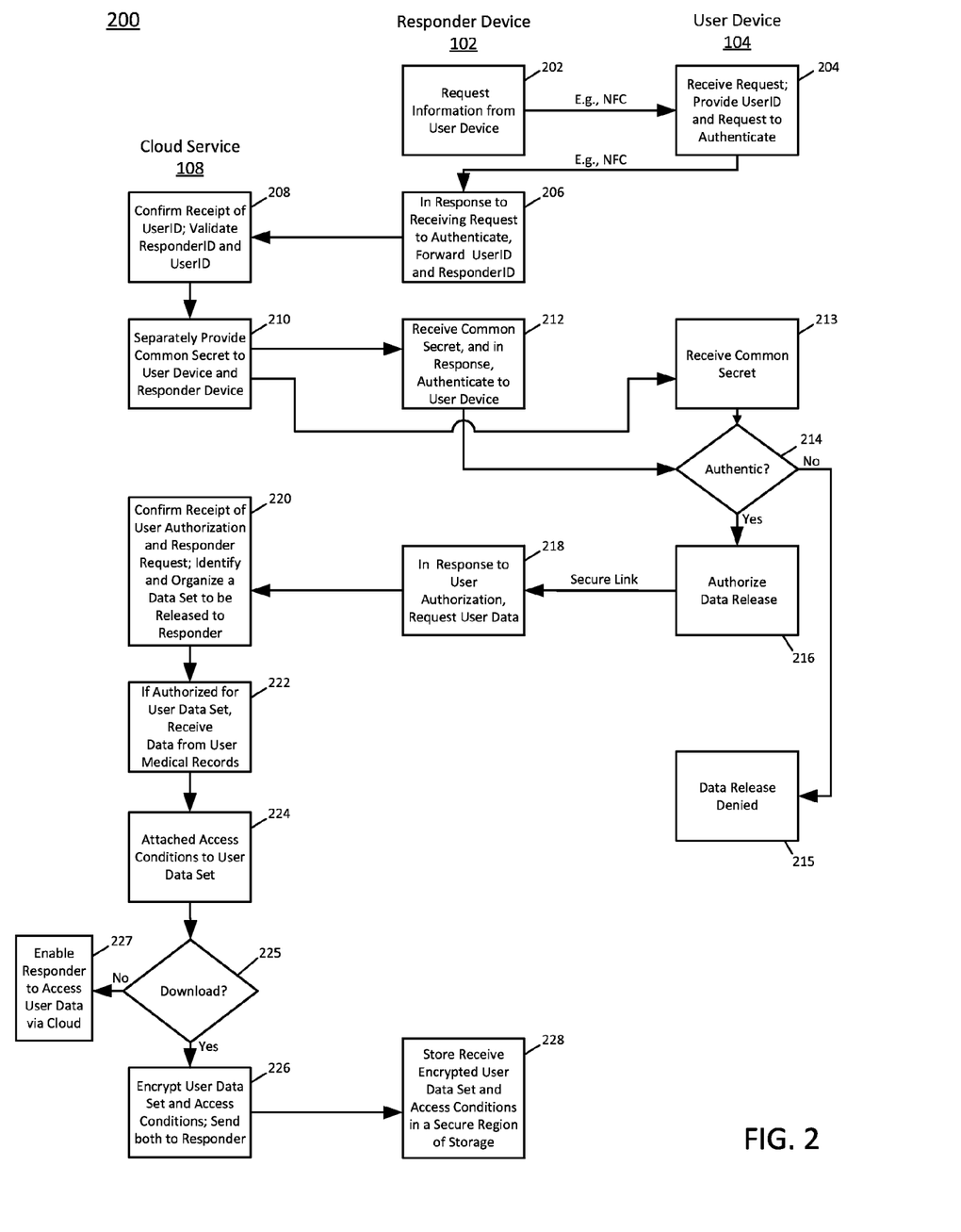
FIG. 2 includes a flowchart of processes in an embodiment of the invention.

FIG. 2 shows an embodiment of processes 200. As shown in FIG. 2, multiple platforms may be involved in the processes 200. These platforms may include the responder device 102, the user device 104, and the cloud service 108. In an embodiment, communications between the different platforms may be primarily via the network 106. The processes 200, however, may be initiated at block 202 when proximity-based communications enable the responder device 102 to communicate with the user device 104. For example, both the devices 102 and 104 may be NFC enabled, and as such, when the responder device 102 is within range of the user device 104, the responder device 102 may send a request for information to the user device 104. In block 204, the user device 104 may respond by supplying the user's UserID to the responder device 102 and by requesting authentication of the responder device 102. In turn, the responder device 102 may connect to the cloud service 108, and in block 206, pass the request for authentication, the UserID, and the responder's ResponderID to the cloud service 108. The cloud service 108, having received the UserID from the responder device 102, may confirm that the responder device 102 and the user device 104 are close enough to enable a secure close-proximity based link such as an NFC link; otherwise, the responder device 102 would not have the UserID (block 208).

In block 208, the cloud service 108 may also validate the UserID and the ResponderID. For example, the cloud service 108 may determine if the UserID and the ResponderID correspond to a currently registered user and a currently approved responder, respectively. To determine if a responder is currently approved, the cloud service 108 may refer to a list of approved responders, the responder's records, and/or the responder's profile to determine if the responder associated with the ResponderID is in good standing, is up-to-date with licenses' and other credentials, permits and the like. The cloud service 108 may also determine the tier to which the responder currently belongs. In an embodiment, the cloud service 108 may determine responder tier after the responder device 102 is successfully authenticated. Likewise, the cloud service 108 may also determine which particular user is associated with the UserID. If the UserID and ResponderID are both validated, in block 210, the cloud service 108 may honor the user request for authentication by sending, in separate communications, a "common secret" to each of the responder device 102 and the user device 104. Generally, a common secret may be secure data or information that is held by more than one entity; the secret or secure data may be a key blob, a digital signature or certificate, or a one-time password (OTP) to name a few examples. In an embodiment, the cloud service 108 may have a special-purpose processor embedded on a motherboard to generate an OTP or a portion thereof (e.g., a number) that is valid for a short time (e.g., a minute, an hour, a day). The embedded processor may be tamper resistant and operate in isolation from the operating system. Thus, the calculations that generate the number are performed in a protected place within compute node hardware. In an embodiment, the generated number may be combined with another factor such as a name or password to create the OTP.

In an embodiment, the responder device 102 authentication may include sending (block 212) the common secret to the user device 104. For example, the responder device 102 may forward the OTP it received from the cloud service 108 to the user device 104. The user device 104, having received (block 213) the same OTP from the cloud service 108, may compare (diamond 214) the OTP received from the responder device 102 to the OTP received from the cloud service 108. If the two OTPs match, the responder device 102 is successfully authenticated. If the two OTPs do not match, the user device 104 may deny the responder device 102 request for information (block 215). The forgoing is just one example of how the cloud service 108, responder device 102, and the user device 104 may interact for authentication purposes. Embodiments of the invention, however, are not limited to this one example. There are many ways for the different platforms to interact and other degrees of authentication. For example, both the responder device 102 and the user device 104 may each be authenticated to each other. Furthermore, embodiments of the invention are not limited with respect to cryptographic methods that may be used in the implementation of the process 200.

If authentication is successful, in block 216, a secure channel or link may be established between the responder device 102 and the user device 104, and the user device 104 may forward, to the responder device 102, an authorization allowing the cloud service 108 to release an appropriate data set to the responder device 102. In block 218, the responder device 102 may forward the user device 104 authorization and send its request for the user information to the cloud service 108.

Thus, in block 220, the cloud service 108 may confirm that its receipt of user authorization from the responder device 102 is an indicator that the responder device 102 was successfully authenticated to the user device 104. As such, the cloud service 108 may identify a tier-appropriate set of user data items that may be released to the responder device 102. For example, the cloud service 108 may have already determined to which tier the responder associated with the ResponderID belongs; if not, the cloud service 108 may do so before proceeding. When the cloud service 108 has obtained the tier associated with the ResponderID, it may consult the data release scheme associated with the UserID. As discussed above, if the user personalized a data release scheme, the cloud service 108 may identify the information elements in the data release scheme that the user marked for release to the responder's determined tier. The data items associated with the marked information elements may form a set of data items to be released to the responder device 102. If the user has not personalized a data release scheme, the cloud service 108 may provide a default set of data items for release to the responder device 102. In block 222, if the identified set of user data items includes information that is stored elsewhere, the cloud service 108 may obtain this data from user medical records and/or other sources (e.g., the storage location 110).

Furthermore, before releasing the tier appropriate set of user data items for access by the responder device 102, in block 224, the cloud service 108 may determine if one or more access conditions are attached to the user data set (e.g., set of user data items to be released according to responder tier). In an embodiment, an access condition may include an access expiration date. For example, the responder device 102 may access information from the user data set stored on the responder device 102, by the cloud service 108, or both for a predetermined amount of time. Thereafter, the responder device 102 is prohibited from accessing the user data; hence, its access time has expired. Access expiration dates may be based on responder tier. For example, responders in Tiers 1 and 2 may need to access user data for a relatively short time; thus, for these responders, access to user data may expire after a few hours. In contrast, responders in Tiers 3, 4, and 5 may need to access user data for a relatively long time; as such, for responders in these tiers, access to user data may expire after several hours or a day. Thus, before allowing the responder device 102 to access the released user data set, the cloud service 108 may determine if the released user data set has a data access expiration date associated therewith.

Another example of an access condition is a data erase date. Generally, a data erase date (or time) is when released user data items are removed from the responder device 102 storage and/or memory or any other temporary storage location such as a temporary storage/memory associated with the cloud service 108, or both. The data erase date may coincide with the access expiration date or it may be some time thereafter. For example, if it is anticipated that the responder device 102 may make a subsequent request for user data within a relatively short time after its access to the user data set has expired, the cloud service 108 may want to delay erasing the user data set from the responder device 102 storage or memory and/or the cloud service 108 temporary storage/ memory. In this way, the cloud service 108 may simply enable the responder device 102 to access the user data set that has already been processed for release and appropriately stored in a temporary storage/memory. This may provide an easier solution to repeating the process 200, or a portion thereof, so that the responder device 102 may again access the released user data set. Like the responder device 102 initial access to the released user data set, each subsequent access may be associated with an access expiration date and a data erase date. Establishing a data access expiration date and a data erase date, may allow the cloud service 108 to maintain control over the released user data set after it is temporarily stored on the responder device 102 or at the cloud service 108.

In diamond 225, the cloud service 108 may determine if some or all of the released data items in the user data set are to be downloaded to the responder device 102 for storage according to the associated access conditions. For example, the cloud service 108 may refer to the user profile, the responder profile, or both to determine if the user and/or responder configured a data access scheme, or otherwise indicated conditions for responder device 102 access to released user data items. If so, the cloud service 108 may distribute the released user data items according to the user and/or responder data access schemes. If neither the user nor the responder configured a data access scheme or the like, the cloud service 108 may distribute released user data items according to a default data access scheme for the responder's designated tier. Furthermore, although FIG. 2 shows determining whether to download user data items after attaching access conditions to the user data set, embodiments are not limited in this aspect. Determining whether to download may take place at any time that it makes sense, such as concurrent with identifying information elements the user marked for release, or after the corresponding data items are ready for release and before one or more data access conditions are attached thereto.

If the cloud service 108 determines that it should not download one or more data items in the user data set to the responder device 102, then, in block 227, the cloud service 108 may store those one or more data items in a cloud-based temporary storage/memory location. To access the user data set or portion of the user data set stored in the cloud, the responder device 102 may connect to the cloud service 108 via the network 106. This connection may be via a secure link, which may be enabled in a manner similar to that established between the responder device 102 and the user device 104. Thus, in an embodiment, the responder device 102 may access the set of user data items (or portion of the data set) stored in the cloud according to the data access conditions associated with the user data set.

If the cloud service 108 determines that one or more user data items in the set are to be downloaded to the responder device 102, in block 226, the cloud service 108 may encrypt the one or more user data items to be downloaded. The cloud service 108 may also encrypt any corresponding access conditions before sending the encrypted information (e.g., encrypted one or more user data items, access conditions) to the responder device 102. In response to receiving the encrypted information, in block 228, the responder device 102 may temporarily store the encrypted information in a secure region of storage or memory. In an embodiment, such secure region may be a secure region of a non-volatile memory device such as a flash memory device. When the encrypted information is stored in a secure region of storage/ memory, the responder device 102 may only access the encrypted one or more user data items according to the associated access conditions. Furthermore, the responder device 102 cannot modify the encrypted data items and access conditions. In an embodiment, only the cloud service 108 may modify the encrypted user data items and/or access conditions (e.g., to enable a new access expiration date).

Thus, according to embodiments of the invention, a responder using responder device 102 may quickly and securely access select user information. Such user information may enable the responder to better assess and treat the user when the user is sick or injured.

Figure 3:
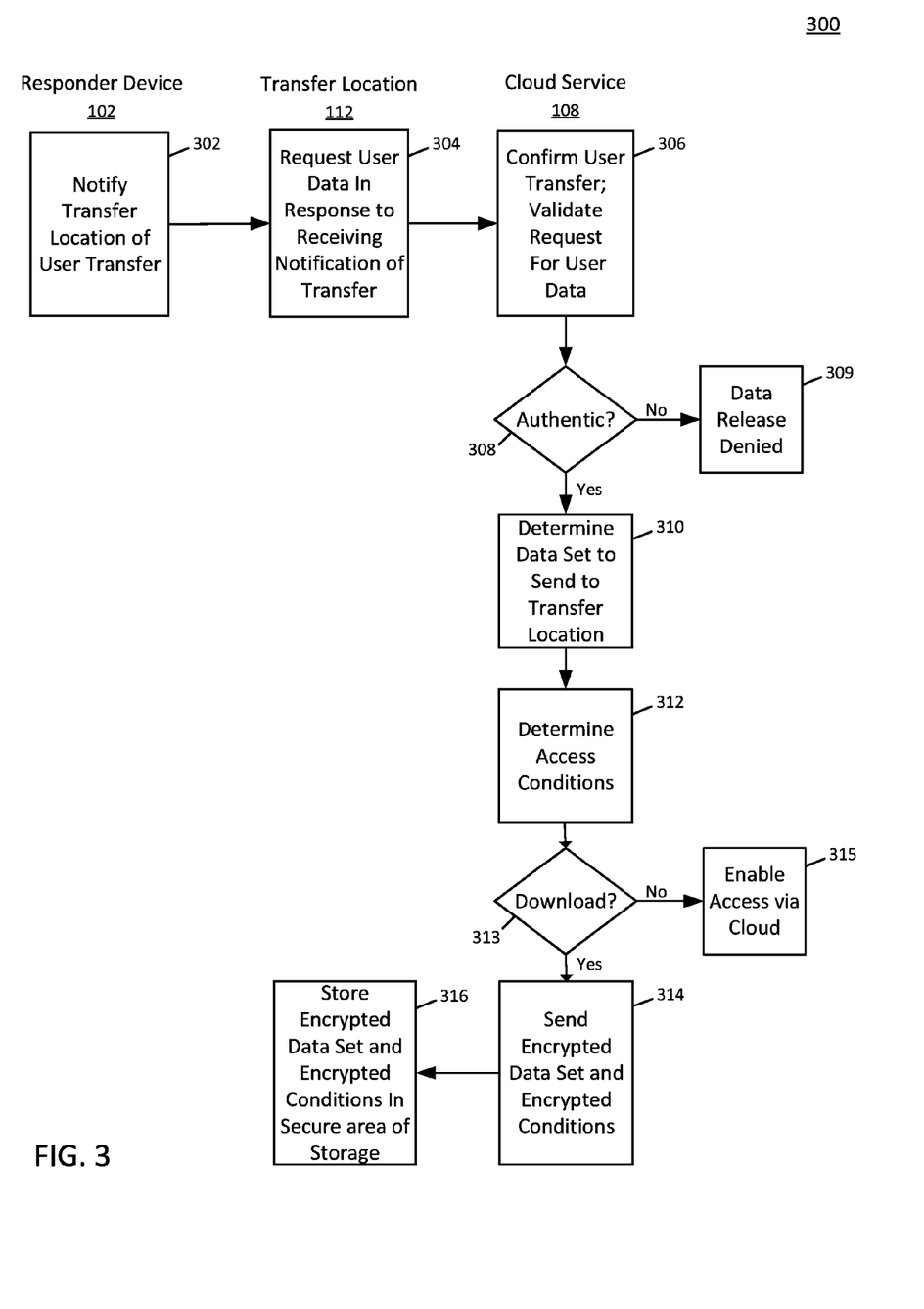
FIG. 3 includes a flowchart of processes in an embodiment of the invention.

In the event the responder determines that the user should be transferred to the transfer location 112 (e.g., hospital emergency room), the responder may notify the transfer location 112 of the user's pending arrival. Referring to FIG. 3, shown is an embodiment of processes 300, which may enable the transfer location 112 to receive user data. As with an embodiment of process 200, multiple platforms (e.g., responder device 102, transfer location 112, and cloud service 108) may be involved in the implementation of an embodiment of processes 300. Communications between the different platforms may be primarily via the network 106.

An embodiment of the processes 300 may begin in block 302 with a responder notification to the transfer location 112 that the user is being transferred or is about to be transferred to the transfer location 112. In an embodiment, the responder may notify the transfer location 112 after the user is transferred to the transfer location 112. In block 304, the transfer location 112 may respond to receiving the responder transfer notification by sending a request for user information to the cloud service 108.

In block 306, the cloud service 108 may confirm the user is being transferred to the transfer location 112 and validate the transfer location 112 request for information. For example, the transfer location 112 request for user information may also include the transfer location 112 ResponderID. Thus, the cloud service 108 may look up the ResponderID to determine to which tier the transfer location 112 belongs, the transfer location name, and/or if the transfer location 112 is approved. In an embodiment, this may be sufficient authentication for cloud service 108 to release user information to the transfer location 112 (diamond 308). In an embodiment, however, cloud server 108 may require a more stringent level of authentication. For example, the transfer location 112 may have received the OTP from the responder device 102 in the responder device 102 notification of user transfer. The transfer location 112 may forward that OTP to the cloud service 108 with its request for user data. Thus, the cloud service 108 may compare the OTP received from the transfer location 112 to the OTP it previously generated (e.g., the common secret) to determine if they match. As another example, the compute node at the transfer location 112 may have a special-purpose processor that is the same as or similar to the one previously described with respect to the cloud service 108, and as such, it may generate a new OTP for the transfer location 112 to send to the cloud service 108. The cloud service may compare the new OTP generated by the transfer location 112 to a number it generates using the same seed and algorithm as that of the transfer location 112 compute node. The cloud service 108 may compare the two new OTPs to see if they match. Thus, in diamond 308 the cloud service 108 may determine if the transfer location 112 has been sufficiently authenticated, such as by matching OTPs.

If authentication of the transfer location 112 is not successful, the cloud service 108 may refrain from releasing user data to the transfer location (block 309). Alternatively, if authentication of the transfer location 112 is successful, then in block 310, the cloud service 108 may identify the set of user data items that the user marked for release to the tier of responder to which the transfer location 112 belongs. The cloud service 108 may identify a set of user data items for release to the transfer location 112 in the same way it identified a set of user data items for release to the responder device 102. Furthermore, an embodiment enables the cloud service 108 simultaneously to identify the set of data items to be released to the transfer location 112 and determine if one or more of the data items to be released may also be downloaded to the transfer location 112. An embodiment may allow such identification and download determination to occur sequentially.

In block 312, the cloud service 108 may determine if one or more access condition are attached to the set of user data items to be released to the transfer location 112. As was discussed with respect to responder device 102, the set of user data items to be released to the transfer location 112 may have an access expiration date, a data erase date, or both associated therewith. In this way, the cloud service 108 may control the duration to which the transfer location 112 may access the released user data set and when the released user data set may be erased.

In an embodiment, the cloud service 108 may determine if one or more user data items identified for release to the transfer location 112 may also be downloaded to transfer location 112, as is shown diamond 313 of FIG. 3. The cloud service 108 may make such determination in the same way or a similar way as discussed above with respect to the responder device 102. If the cloud service 108 determines that one or more of the user data items to be released to the transfer location 112 should not be downloaded to the transfer location 112, the cloud service 108 may store those one or more user data items in a temporary location in the cloud. The transfer location 112 may access (block 315) the one or more user data items stored in the cloud over the network 106 in the same way as the responder device 102. Although stored in the cloud, the one or more user data items may have access conditions associated therewith. Thus, the compute node at the transfer location 112 may access those user data items stored in the cloud only as enabled by the associated access conditions. If the cloud service 108 determines (diamond 313) that one or more user data items in the set are to be downloaded to the transfer location 112, then, in block 314, the cloud service 108 may encrypt those one or more user data items and associated access conditions. Thereafter, the cloud service 108 may send the encrypted information to the transfer location 112.

Responsive to receipt of the encrypted information, the transfer location 112 may store the encrypted information in a secure region of a storage device or memory (block 316) such as a secure region of a flash memory. Furthermore, the transfer location 112 may access the encrypted user data items for as long as the associated access conditions allow. In an embodiment, the encrypted user data items may be erased upon reaching the access expiration date or some time thereafter. For example, if the user data items are not erased upon reaching the access expiration date, the cloud service 108 may enable the transfer location 112 to have additional access to the encrypted user data items without having to resend encrypted information or a relevant portion thereof.

Thus, embodiments of the invention may allow quick and secure release of select user information to medical personnel (e.g., doctors, nurses) at the transfer location 112.

Figure 4:
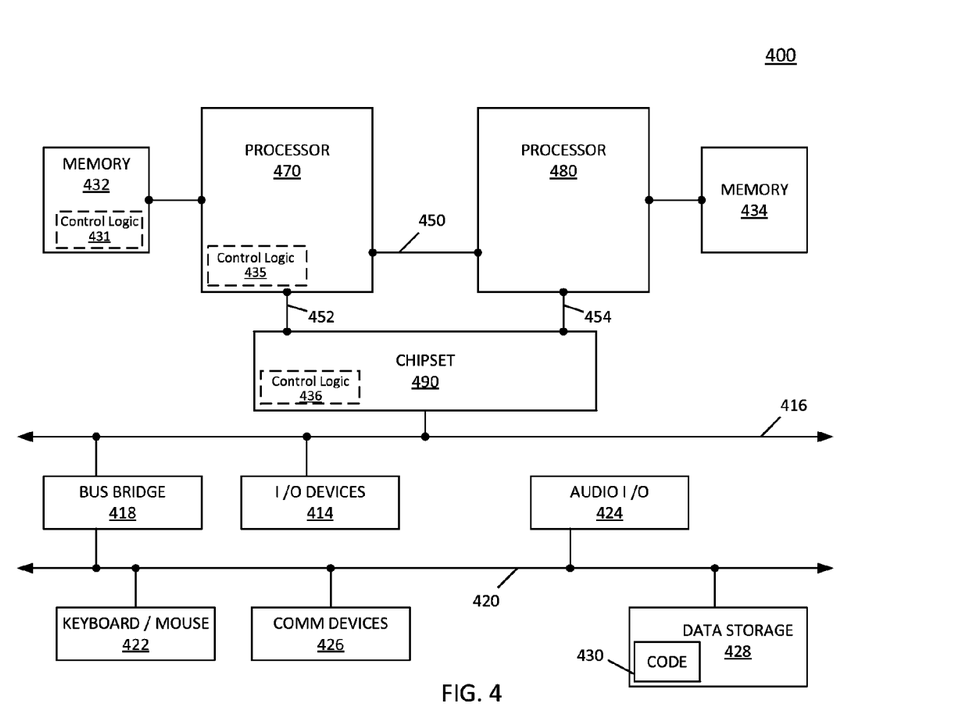
FIG. 4 includes a system for use with various embodiments of the invention.

Embodiments may be implemented in many different system types. Referring now to FIG. 4, shown is a block diagram of a system in accordance with an embodiment of the present invention. Multiprocessor system 400 is a point-to-point interconnect system, and includes a first processor 470 and a second processor 480 coupled via a point-to-point interconnect 450. Each processor 470 and 480 may be multicore processors. The term "processor" may refer to any device or portion of a device that processes electronic data from registers and/or memory to transform that electronic data into other electronic data that may be stored in registers and/or memory. First processor 470 may include a memory controller hub (MCH) and point-to-point (P-P) interfaces. Similarly, second processor 480 may include a MCH and P-P interfaces. Although not shown, an embodiment may also include a special purpose processor to generate one-time passwords. The MCHs may couple the processors to respective memories, namely memory 432 and memory 434, which may be portions of main memory (e.g., a dynamic random access memory (DRAM)) locally attached to the respective processors. First processor 470 and second processor 480 may be coupled to a chipset 490 via P-P interconnects, respectively. Chipset 490 may include P-P interfaces. Furthermore, chipset 490 may be coupled to a first bus 416 via an interface. Various input/output (I/O) devices 414 may be coupled to first bus 416, along with a bus bridge 418, which couples first bus 416 to a second bus 420. Various devices may be coupled to second bus 420 including, for example, a keyboard/mouse 422, communication devices 426, and data storage unit 428 such as a disk drive or other mass storage device, which may include code 430, in one embodiment. Code may be included in one or more memories including memory 428, 432, 434, memory coupled to system 400 via a network, and the like. Further, an audio I/O 424 may be coupled to second bus 420.

Embodiments may be implemented in code and may be stored on at least one storage medium having stored thereon instructions which can be used to program a system to perform the instructions. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions. In an embodiment, a storage medium may include a secure region.

Embodiments of the invention may be described herein with reference to data such as instructions, functions, procedures, data structures, application programs, configuration settings, code, and the like. When the data is accessed by a machine, the machine may respond by performing tasks, defining abstract data types, establishing low-level hardware contexts, and/or performing other operations, as described in greater detail herein. The data may be stored in volatile and/or non-volatile data storage. In an embodiment, data may be stored in a secure region of a non-volatile data storage. The terms "code" or "program" cover a broad range of components and constructs, including applications, drivers, processes, routines, methods, modules, and subprograms and may refer to any collection of instructions which, when executed by a processing system, performs a desired operation or operations. Additionally, alternative embodiments may include processes that use fewer than all of the disclosed operations, processes that use additional operations, processes that use the same operations in a different sequence, and processes in which the individual operations disclosed herein are combined, subdivided, or otherwise altered.

In one embodiment, use of the term control logic includes hardware, such as transistors, registers, or other hardware, such as programmable logic devices (435). However, in another embodiment, logic also includes software or code (431). Such logic may be integrated with hardware, such as firmware or micro-code (436). A processor or controller may include control logic intended to represent any of a wide variety of control logic known in the art and, as such, may well be implemented as a microprocessor, a micro-controller, a field-programmable gate array (FPGA), application specific integrated circuit (ASIC), programmable logic device (PLD) and the like.

The following examples pertain to further embodiments. Specifics in the examples may be used anywhere in one or more embodiments.

Example 1 may include subject matter such as an apparatus, method, or computer program for secure information release, which includes in response to receipt of a user request to authenticate a responder compute node, separately send a common secure data to each of a user compute node and the responder compute node, the user request to authenticate received from the responder compute node, and in response to receipt of a user authorization to release one or more select user data items to the responder compute node, enable the responder compute node to access the one or more select user data items, the user authorization received from the responder compute node. The apparatus may comprise at least one processor, and control logic coupled to the at least one processor.

In Example 2, the subject matter of Example 1 can optionally include a special-purpose processor. The special-purpose processor can generate the common secure data to use as a one-time password; the one-time password separately sent to each of the user compute node and the responder compute node. Example 2 may also optionally include the special-purpose processor embedded on a motherboard. Example 2 may also optionally include a number as the one-time password.

In Example 3, the subject matter of either Example 1 or 2 can optionally include identify one or more access conditions associated with the one or more select user data items, the one or more access conditions to control the responder compute node ability to access the one or more user data items, and in response to a determination that at least one of the one or more select user data items and the identified one or more access conditions are to be downloaded to the responder compute node, encrypt the at least one of the one or more select user data items and the identified one or more access conditions before downloading to the responder compute node. Example 3 may also optionally include a storage to store the at least one of the one or more select user data items and the identified one or more access conditions. Example 3 may also optionally include the responder compute node enabled to access the one or more select user data items stored in the storage over a network connection. Example 3 may also optionally include the at least one or more select user data items stored both on the responder compute node and on the storage. Example 3 may also optionally include, the responder compute node enabled to securely access the one or more select user data items from either a secure region of a memory device coupled to the responder compute node, or the storage, or both.

In Example 4, the subject matter of Examples 1, 2, or 3 can optionally include in response to receipt of the user request to authenticate together with both a unique user identifier and a unique responder identifier from the responder compute node, and confirm that the responder compute node is in close proximity to the user compute node, identify a user associated with the unique user identifier and a responder associated with the unique responder identifier, and in response to a determination that the user is a registered user and the responder is an approved responder, separately send the common secure data to each of the user compute node and the responder compute node.

In Example 5, the subject matter of Examples 1-4 can optionally include in response to receipt of the user authorization to release one or more select user data items, consult a responder profile for the identified responder to determine a particular responder category to which the identified responder belongs, and consult a user profile for the identified user to determine the one or more user data items the user selected to be released to the determined particular responder category. Example 5 may also optionally include the particular responder category being one responder category out of a plurality of different responder categories.

In Example 6, the subject matter of any of Examples 1-5 may optionally include determine from the one or more user data items the user selected to be released to a responder that belongs to a determined particular responder category that includes at least one of firefighters, peace officers, and paramedics. Example 6 may optionally include consulting a user profile to determine the one or more user data items the user selected to be released to a responder.

In Example 7, the subject matter of Examples 1 and 4-5 may optionally include, receive, from a transfer location compute node, a request to release the identified user's data, evaluate whether the request from the transfer location compute node is authentic, determine, from the user profile, the one or more user data items the user selected to be released to a responder category that includes the transfer location, attach one or more access conditions to the one or more user data items selected to be released to the transfer location, encrypt the one or more user data items to be released to the transfer location and the one or more access conditions, and send the encrypted user data items and access conditions to the transfer location compute node. Example 7 may also optionally include the transfer location determined to be from a responder category that includes an emergency room. Example 7 may also optionally include causing the transfer location compute node to store the encrypted user data items and access conditions in a memory coupled to the transfer location compute node, the encrypted access conditions to control the transfer location compute node's access to the encrypted user data items. Example 7 may also optionally include causing the transfer location to store the encrypted data items and access conditions in a secure region of a flash memory. Example 7 may also optionally include the transfer location to request release of the identified user's medical data.

Example 8 may include subject matter such as an apparatus, method, system, or computer program product for secure information release that includes, confirm receipt of a user request to authenticate a responder device and a unique user identifier from the responder device as an indicator of a secure proximity-based communications link between the responder device and a user device, send a common secure data in a separate communication to each of the responder device and the user device, confirm receipt of a user authorization to release a set of user data items to the responder from the responder device as an indicator that the responder device was successfully authenticated by verification of the common secure data, and obtain a type-appropriate set of user data items to release to the responder.

Example 9 includes the subject matter of Example 8 and further includes receive a unique responder identifier from the responder device, refer to a list of approved responders to identify the responder associated with the unique responder identifier and the responder's designated type, and based on the responder's identified designated type, organize the user data items designated for release to the responder's designated type into the type-appropriate set of user data items. Example 9 may optionally include wherein the user data items designated for the responder's identified type are obtained from a user profile.

Example 10 can include the subject matter of Example 8 or 9 and can further include attach one or more data access conditions to the type-appropriate set of user data items, and in response to a determination that the type-appropriate set of user data items, or the portion thereof, and the attached data access conditions are to be downloaded to the responder device, encrypt the type-appropriate set of user data items, or the portion thereof, and the attached data access conditions, otherwise store the type-appropriate set of user data items or a portion thereof and the attached data access conditions in a storage. Example 10 can also optionally include send the encrypted type-appropriate set of user data items, or the portion thereof, and the attached data access conditions to the responder device. Example 10 can also optionally include cause the responder device to store the encrypted type-appropriate set of user data items, or the portion thereof, and the attached data access conditions in a secure region of a memory medium. Example 10 can also include enable the responder device to access the encrypted set of user data items, or the portion thereof, from the memory medium in accordance with the attached data access conditions. Example 10 can also optionally include enable the responder device to access the type-appropriate set of user data items, or the portion thereof, stored in the storage through a network connection and in accordance with the attached data access condition.

Example 11 can include the subject matter of Examples 8, 9, or 10, and can optionally include, identify the responder associated with the unique responder identifier as a heath care professional, and based on the designated type of health care profession consult a user profile for the user to determine which user data items are designated for release to the health care professional type. Example 11 can also optionally include identify the health care professional's type as a type that includes an emergency room.

Example 12 can include the subject matter of Examples 8-11 and can further include, in response to receipt of a request for user information from a compute node at a transfer location, confirm that the user is to be transferred to the transfer location and that the transfer location is on the list of approved responders based on the transfer location's unique responder identifier, based on the transfer location's identified type, obtain and organize a type-appropriate set of user data items to send to the transfer location, and send an encrypted type-appropriate set of user data items to the transfer location. Example 12 can further optionally include an admitting hospital as a transfer location.

Example 13 can include the subject matter of any Example 8-12, and can further include send the common secure data as one of, a key blob, a digital signature, a digital certificate, and a one-time password.

Example 14 can include the subject matter of any of Examples 8-13 and can further include generate the one-time password using a special-purpose processor. Example 14 may optionally further include the special-purpose processor embedded on a computer motherboard.

Example 15 includes a system, apparatus, method, or computer program product that includes, a compute node, and at least one processor and control logic coupled to the compute node, the at least one processor to, in response to receipt of a unique user identifier, a unique responder identifier, and a user request for authentication from a responder compute node, associate the unique user identifier with a particular user and the unique responder identifier with a particular responder, send a common secure data in a separate communication to each of the responder compute node and a user compute node, and in response to receipt of the particular user's authorization to release a responder-appropriate set of user data items to the particular responder from the responder compute node, enable the responder compute node to access the responder-appropriate set of user data items. Example 15 may also optionally include, wherein each of the responder compute node and the user compute node is a mobile compute node. Example 15 may also optionally include wherein the responder compute node is enabled to securely access the responder-appropriate set of user data items.

Example 16 can include the subject matter of Example 15, and can further include, confirm receipt of the unique user identifier from the responder compute node as an indicator of a near field communication link between the responder compute node and the user compute node; and confirm receipt of the particular user's authorization to release the responder-appropriate set of user data items from the responder compute node as an indicator that the responder compute node was successfully authenticated by use of the common secure data. Example 16 may also optionally include wherein the near field communication link is a secure near field communication link.

Example 17 can include the subject matter of claims 15 or 16, and can further include, a storage device coupled to the compute node, the storage device to store a list of approved responders and a plurality of user profiles, each responder on the list of approved responders associated with a corresponding unique responder identifier and a designated responder type, and each user profile in the plurality of user profiles i) associated with an individual user and that individual user's unique user identifier, and ii) to include an optional user-configured data release scheme to define one or more user data items to be released to a responder of a given responder type Example 18 can include the subject matter of claims 15-17, and can further include, determine the particular responder's designated responder type, refer to the particular user's data release scheme to determine the one or more user data items the user configured for release to the particular responder's designated responder type, and organize the determined one or more user data items into the responder-appropriate set of user data items, otherwise if the particular user did not configure a data release scheme, organize a default set of user data items into the responder-appropriate set of user data items.

Example 19 can include the subject matter of Example 15 or 16, and can further include a special-purpose processor to generate a one-time password as the common secure data, the one-time password valid for pre-determined length of time. Example 19 may optionally also include the special-purpose processor is embedded on a motherboard.

Example 20 can include the subject matter of any one of Example 15-17, or 19, and can further include, associate an access expiration time, a data erase time, or both with the responder-appropriate set of user data items, the access expiration time to define a time, that when reached, the responder compute node can no longer access the responder-appropriate set of user data items, and the data erase time to define a time to erase the responder-appropriate set of user data items. Example 20 may also optionally include wherein the data erase time is to define a time to erase the responder-appropriate set of user data items from a temporary storage medium.

Example 21 can include the subject matter of Examples 15 and 20, and can further include, in response to a determination that the responder-appropriate set of user data items, or a portion thereof, and the associated access expiration time, data erase time, or both are to be downloaded to a responder compute node, encrypt the responder-appropriate set of user data items, or the portion thereof, and the associated access expiration time, data erase time, or both before sending to the responder compute node.

Example 22 can include the subject matter of Examples 15 and 20-21, and can further include, store the responder-appropriate set of user data items, or the portion thereof, and the associated access expiration time, data erase time, or both in a storage medium associated with the system to enable the responder compute node to access the responder-appropriate set of user data items, or the portion thereof, through a network connection and in accordance with the associated access expiration time, data erase time, or both. Example 22 may optionally include causing the responder compute node to store the encrypted responder-appropriate set of user data items, or the portion thereof, and the associated access expiration time, data erase time, or both in a secure region of a temporary storage medium coupled to the responder compute node, the responder compute node to be enabled to access the encrypted responder-appropriate set of user data items, or the portion thereof, from the secure region of the temporary storage medium coupled to the responder compute node in accordance with the associated access expiration time, data erase time, or both.

Example 23 can include the subject matter of Example 15, and can further include identify a user-configured set of user data items that are appropriate for release to a responder that is a medical health care professional, collect current medical data from an electronic storage that is remote to the at least one processor to include in the user-configured set of user data items, and encrypt the user-configured set of user data items, which is to include the current medical data, to send to the responder mobile compute node.

Example 24 can include subject matter that is an apparatus, a method, or a computer program product for secure information release, which can include at least one processor, and control logic coupled to the at least one processor, the control logic to, in response to receipt of a request for information from a responder device, supply the responder device with a unique user identifier and a request to authenticate the responder device, and in response to receipt of a common secure data from the responder device, compare the common secure data received from the responder device to a common secure data received from a remote provider to determine if there is a match.

Example 25 can include the subject matter of Example 24 and can further include, wherein the control logic is to, in response to a determined match between the common secure data received from the responder device and the common secure data received from the remote provider, allow a secure link between the responder device and the apparatus to be established.

Example 26 can include the subject matter of Example 24 or 25 and can further include, wherein the control logic is to, in response to a determined match between the common secure data received from the responder device and the common secure data received from the remote provider, supply an authorization to release responder-appropriate information to the responder device.

Example 27 can include the subject matter of Example 24 and can further include wherein the control logic is to, in response to a failed match between the common secure data received from the responder device and the common secure data received from the remote provider, deny the request for information received from the responder device.

All optional features of apparatus(s) described above may also be implemented with respect to method(s) or process(es) described herein. While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. At least one non-transitory computer accessible medium including instructions that when executed cause a system to:

confirm receipt of a user request to authenticate a responder device and a unique user identifier from the responder device as an indicator of a secure proximity-based communications link between the responder device and a user device;

send a common secure data in a separate communication to each of the responder device and the user device, wherein the user device is only able to communicate its unique user identifier to the responder device via a near field communication;

confirm receipt of a user authorization to release a set of user data items to the responder from the responder device as an indicator that the responder device was successfully authenticated by verification of the common secure data; and obtain a type-appropriate set of user data items to release to the responder.

2. The at least one computer accessible medium of claim 1, further comprising instructions to enable the system to:

receive a unique responder identifier from the responder device;

refer to a list of approved responders to identify the responder associated with the unique responder identifier and the responder's designated type; and based on the responder's designated identified type, obtain the type-appropriate set of user data items.

3. The at least one computer accessible medium of claim 2, further comprising instructions to enable the system to:

attach one or more data access conditions to the type-appropriate set of user data items; and in response to a determination that the type-appropriate set of user data items, or a portion thereof, and the attached data access conditions are to be downloaded to the responder device, encrypt the type-appropriate set of user data items, or the portion thereof, and the attached data access conditions, otherwise store the type-appropriate set of user data items, or the portion thereof, and the attached data access conditions in a storage associated with the system.

4. The at least one computer accessible medium of claim 2, further comprising instructions to enable the system to:

identify the responder associated with the unique responder identifier as a health care professional; and based on the designated type of health care professional, consult a user profile for the user to determine which user data items are to be included in the health care professional set of data items.

5. The at least one computer accessible medium of claim 1, further comprising instructions to enable the system to:

in response to receipt of a request for user information from a compute node at a transfer location, confirm that the user is to be transferred to the transfer location and that the transfer location is on the list of approved responders based on the transfer location unique responder identifier;

based on the transfer location identified type, obtain and organize a type-appropriate set of user data items to send to the transfer location; and send an encrypted type-appropriate set of user data items to the transfer location.

6. The at least one computer accessible medium of claim 1, further comprising instructions to enable the system to, send the common secure data as one of, a key blob, a digital signature, a digital certificate, and a one-time password.

7. The at least one computer accessible medium of claim 6, further comprising instructions to enable the system to, generate the one-time password using a special-purpose processor.

8. A system comprising:

a compute node; and at least one processor and control logic coupled to the compute node, the at least one processor to:

in response to receipt of a unique user identifier, a unique responder identifier, and a user request for authentication from a responder compute node, associate the unique user identifier with a particular user and the unique responder identifier with a particular responder;

send a common secure data in a separate communication to each of the responder compute node and a user compute node, wherein the user device is only able to communicate its unique user identifier to the responder device via a near field communication; and in response to receipt of the particular user's authorization to release a responder-appropriate set of user data items to the particular responder from the responder compute node, enable the responder compute node to access the responder-appropriate set of user data items.

9. The system of claim 8 wherein the at least one processor is to:

confirm receipt of the unique user identifier from the responder compute node as an indicator of a near field communication link between the responder compute node and the user compute node; and confirm receipt of the particular user's authorization to release the responder-appropriate set of user data items from the responder compute node as an indicator that the responder compute node was successfully authenticated by use of the common secure data.

10. The system of claim 8 further comprising:

a storage device coupled to the compute node, the storage device to store a list of approved responders and a plurality of user profiles, each responder on the list of approved responders associated with a corresponding unique responder identifier and a designated responder type, and each user profile in the plurality of user profiles i) associated with an individual user and that individual user's unique user identifier, and ii) to include an optional user-configured data release scheme to define one or more user data items to be released to a responder of a given responder type.

11. The system of claim 10 wherein the at least one processor is to:

determine the particular responder's designated responder type;

refer to the particular user's data release scheme to determine the one or more user data items the user configured for release to the particular responder's designated responder type; and organize the determined one or more user data items into the responder-appropriate set of user data items, otherwise if the particular user did not configure a data release scheme, organize a default set of user data items into the responder-appropriate set of user data items.

12. The system of claim 8 further comprising a special-purpose processor to generate a one-time password as the common secure data, the one-time password valid for predetermined length of time.

13. The system of claim 8 wherein the at least one processor is to, associate an access expiration time, a data erase time, or both with the responder-appropriate set of user data items, the access expiration time to define a time, that when reached, the responder compute node can no longer access the responder-appropriate set of user data items, and the data erase time to define a time to erase the responder-appropriate set of user data items.

14. The system of claim 13 wherein the at least one processor is to, in response to a determination that the responder-appropriate set of user data items, or a portion thereof, and the associated access expiration time, data erase time, or both are to be downloaded to a responder compute node, encrypt the responder-appropriate set of user data items, or the portion thereof, and the associated access expiration time, data erase time, or both before sending to the responder compute node.

15. The system of claim 13 wherein the at least one processor is to, store the responder-appropriate set of user data items, or the portion thereof, and the associated access expiration time, data erase time, or both in a storage medium associated with the system to enable the responder compute node to access the responder-appropriate set of user data items, or the portion thereof, through a network connection and in accordance with the associated access expiration time, data erase time, or both.

16. The system of claim 8 wherein the responder is a medical health care professional and the at least one processor is to:
    identify a user-configured set of user data items that are appropriate for release to the medical health care professional;
    collect current medical data from an electronic storage that is remote to the at least one processor to include in the user-configured set of user data items; and
    encrypt the user-configured set of user data items, which is to include the current medical data, to send to the responder compute node.

* * * * *